May 23, 1967
A. E. COOPER
3,321,046
WHEEL BLOCKING SYSTEM
Filed May 2, 1966
2 Sheets-Sheet 1
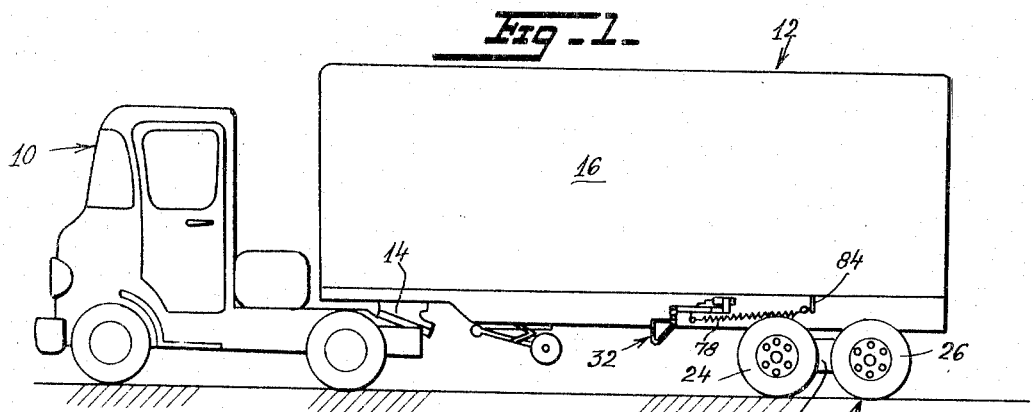
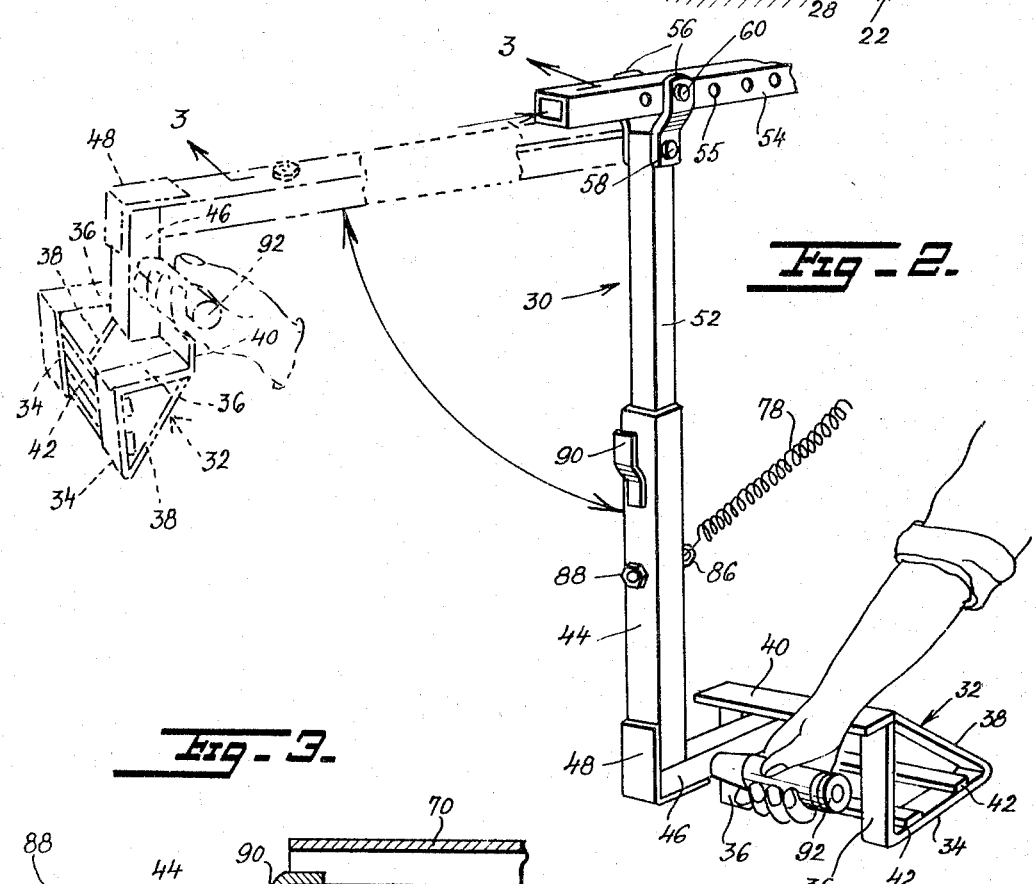
INVENTOR
Arley E. Cooper
BY Polachek & Saulsbury
ATTORNEYS May 23, 1967 A. E. COOPER 3,321,046
WHEEL BLOCKING SYSTEM
Filed May 2, 1966 2 Sheets-Sheet 2
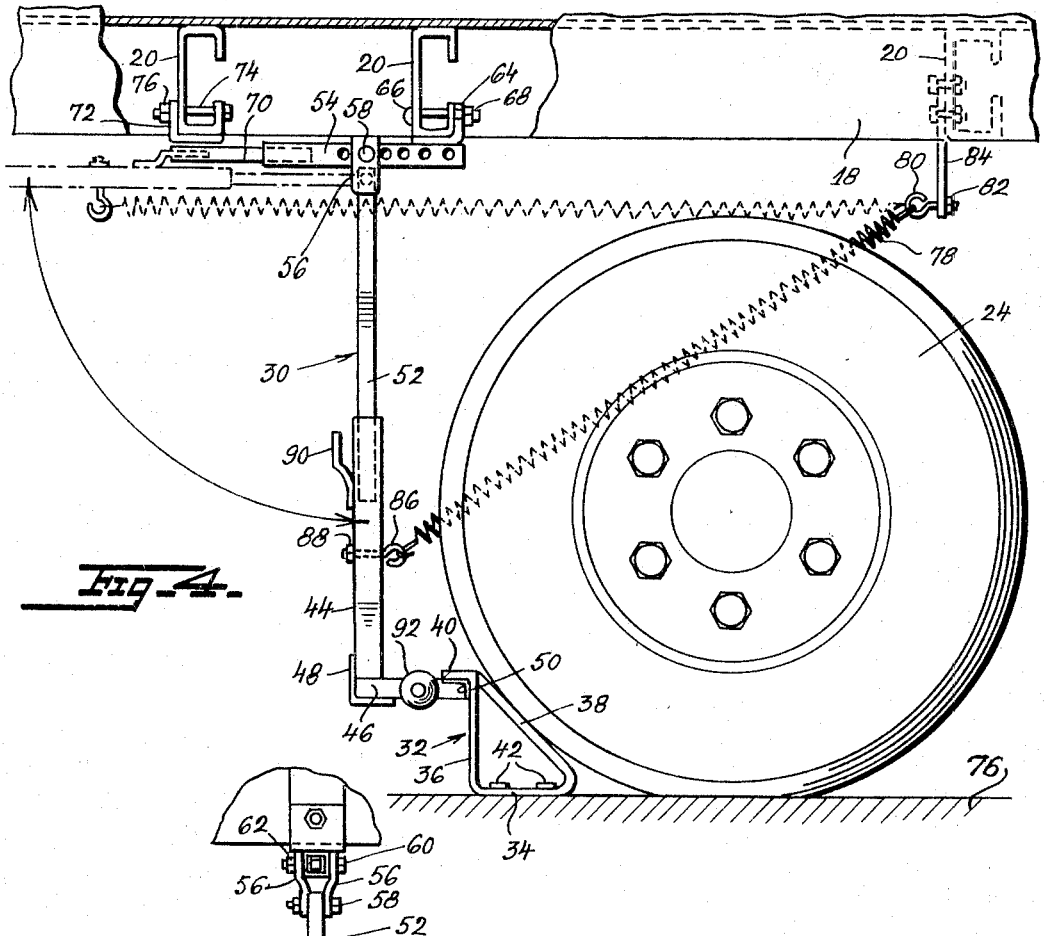
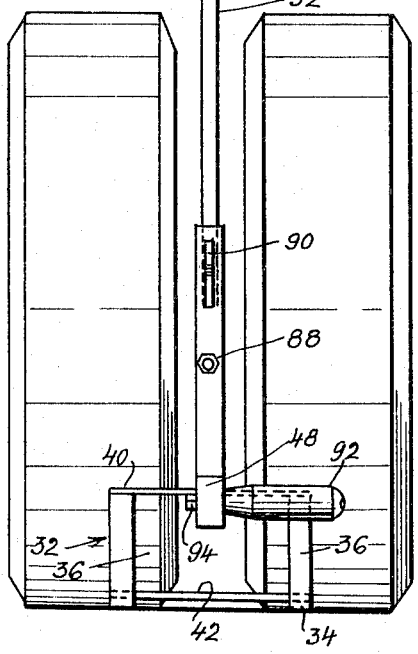
INVENTOR
Arley E. Cooper
BY
Polachek & Saulsbury
ATTORNEYS United States Patent Office 3,321,046
Patented May 23, 1967

3,321,046
WHEEL BLOCKING SYSTEM
Arley E. Cooper, R.R. 1, Morton, Ill. 61550
Filed May 2, 1966, Ser. No. 547,012
3 Claims. (Cl. 188—4)

This invention relates to mechanical wheel-blocking apparatus for trucks and other vehicles.

It is well known that in the operation of trucks and other large motor vehicles, it is customary for the operators or drivers to carry with them blocks of wood which are square in cross-section, for use in passing over steep grades where there is danger of slippage or sliding in the event that the motor stalls, or where it is necessary to stop on a steep grade, or sliding when the truck is being loaded on a dock, to prevent the vehicle from starting or moving backward.

A primary object of the present invention is to eliminate the necessity for such blocks and to provide mechanical wheel-blocking apparatus which may be utilized for blocking the rear wheels of a large truck and the like adapted to carry heavy loads in order to prevent rearward or forward movement of the vehicle.

Another object of the invention is to provide mechanically operated means mounted in operative position in connection with the rear wheels to obtain road gripping action to prevent undesired slipping or sliding movement of the vehicle on a grade, whether in a forward or rearward direction.

Still another object of the invention is to provide a vehicle wheel-blocking apparatus which is suspended in position for operation in such a manner as to maintain a constant distance from the road surface irrespective of changes in load conditions of the vehicle.

Yet another object of the invention is to provide mechanical wheel-blocking apparatus which will conform to conventional forms of manufacture, be of simple and rugged construction and easy to operate so as to provide apparatus which will be economically feasible, long lasting and relatively trouble free.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a side elevational view of a tractor-trailer showing improved wheel-blocking apparatus mounted thereon.

FIG. 2 is a side perspective view of the improved wheel-blocking apparatus removed from the tractor-trailer operative in distended position, showing the apparatus in dash-lines in inoperative position.

FIG. 3 is a sectional view taken on the plane of the line 3—3 of FIG. 2.

FIG. 4 is a side elevational view of the wheel-blocking apparatus in operative position against the rear wheels of the tractor-trailer, parts being shown broken away.

FIG. 5 is an elevational view of the wheels and apparatus shown in FIG. 4, looking from the left of FIG. 4.

Referring now to the drawings in detail, wherein for the purposes of illustration there is disclosed a preferred embodiment of the present invention, the numeral 10 designates a tractor of the usual form which is connected to a trailer 12 having a coupling device 14 by means of which the trailer is drawn.

The body 16 of the trailer 12 is mounted on a chassis including elongated channel-shaped frame members 18 at the sides connected by C-shaped transverse members 20 spaced therealong. The chassis is supported on rear wheel assemblies 22 on both sides of the trailer. Each wheel assembly includes a front pair of wheels 24 and a rear pair of wheels 26 suitably connected by bars 28.

In accordance with the present invention, wheel-blocking apparatus such as designated generally at 30 is associated with the front pair of wheels 24 of each rear assembly. As best shown in FIG. 2, the wheel-blocking apparatus comprises an elongated shoe or shock block device 32, substantially wedgeshape or triangular shape in configuration and cross-section, with an open steel frame-like body having flat bottom end bars 34, 34, flat bars 36, 36 extending perpendicularly from one end of the bars 34 and integral flat bars 38, 38 extending angularly upwardly and inwardly from the other end of the bars 34, 34 contacting the top of the bars 36, 36 at the top ends thereof. An integral flat bar 40 joins the top ends of the bars 36, 36. The bar 40 is disposed in a plane parallel to the plane of the end bars 34, 34 and extends in a direction away from the slanting bars 38. Elongated flat bracing bars 42, 42 extend across and are secured to the upper surfaces of the bars 34, 34 joining said bars 34, 34.

The shoe 32 is carried by an elongated tubular sleeve 44 square in cross-section at one end thereof which end is fastened to the shoe 32 device by means of an elongated square shaped bar 46 secured at one end of the bottom end edge of the bar 44 as seen in FIG. 2 by means of an L-shaped joint 48 welded to the ends of the sleeve and bar 46. The other end of the bar 46 is fastened to the bar 40 of the shoe device 32 by means of an L-shaped joint 50 welded to said other end edge of the bar 46 and to the under surface of the bar 40 of the shoe device 32. An elongated tubular arm 52 is slidably and telescopically mounted at one end in the sleeve 44. The bar 52 is pivotally and adjustably fastened at its other end to a tubular member 54, with a series of spaced holes 55 therein, by means of opposed metal straps 56 pivotally fastened to the top end of the bar 52 by a pivot pin 58 and adjustably secured to the tubular member 54 by means of a bolt 60 and nut 62 assembly. The tubular member 54 is welded at one end to an L-shaped bracket 64 fastened to one of the C-shaped frame member 20 by means of a bolt 66 and nut 68 assembly extending through aligned holes in the C-shaped frame member 20 and bracket 64. The other end of the tubular member 54 is sleeved over one end of a tubular member 70 similarly secured at its other end to an L-shaped bracket 72 fastened to an adjacent C-shaped frame member 20 by means of a bolt 74 and nut 76 assembly extending through aligned holes in the C-shaped frame member and bracket 72. An elongated compression spring 78 has one end fastened to a hook 80 and nut 82 assembly mounted on the bottom end of a hanger 84 secured to and depending from another C-shaped frame member 20. The other end of the compression spring is fastened to a hook 86 and nut 88 assembly extending through aligned holes in the sleeve 44 adjacent the bottom end thereof. A metal finger 90 is welded at one end to the sleeve 44 adjacent its open top end as viewed in FIG. 2, the finger having its other end spaced from the body of the sleeve and free and extending longitudinally of the body and in a direction toward the free end thereof. An elongated solid cylindrical handle 92 extends laterally of the bar 46 midway its ends and has a reduced threaded portion extending through a transverse hole in the bar 46 to receive a nut 94 to hold it in position. The handle is disposed on a plane parallel to the plane of the end bars 34, 34.

During normal operation of the truck and trailer, the emergency wheel-blocking apparatus is retained in normal inoperative position in collapsed horizontal position underneath the floor of the trailer 16 as shown in FIG. 1, with the shoe assembly in horizontal position and the finger 90 slid into interlocking engagement in the end of tubular member 70 as best seen in FIG. 3.

In operation, assuming the wheel-blocking apparatus is in upper inoperative position as shown in full lines in FIG. 1 and phantom lines in FIG. 2, the driver gets out of the truck grasps the handle 92 pulls it toward the left as viewed in FIGS. 1 and 2 sliding the sleeve 44 along the bar 52 thereby removing and releasing the finger 90 from the tubular member 70 whereupon the shoe block device 32 drops swinging rearwardly on the pivot pin 58 to the vertical operative position shown in FIG. 4 bringing the slanting arms 38, 38 of the shoe device 32 into contact with the confronting surfaces of the wheels 24, and the end bars 42, 42 into contact with the supporting surface 96 immediately adjacent the point at which the wheel 24 is engaged with the supporting surface 96. The compression springs 78 hold the shoe devices in wheel and road engaging position.

In order to raise the shoe device 32 and associated parts to upper inoperative position, the driver grasps the handle 92 and pulls rearwardly and upwardly in the direction of the arrows in FIG. 2 against the action of spring 78 to a horizontal position as shown in phantom lines in FIG. 2, whereupon the spring after it reaches dead center pulls the sleeve 44 toward the tubular member 70 causing the finger 90 to enter said tubular member 70 for holding the shoe device in upper inoperative position.

The foregoing is considered as illustrative of the principles of the invention, and while I have illustrated and described the preferred embodiment of the invention, it is to be understood that I do not limit myself to the precise construction herein disclosed and that various changes and modifications may be made within the scope of the invention as defined in the appended claims.

What is claimed is:

1. In combination with a vehicle including a chaissis having a tubular member, wheel-blocking apparatus comprising a tubular bar, means mounting said tubular bar from said tubular member for pivotal movement relative to the tubular member, a wedge-shaped shoe device, means rigidly and adjustably connecting said shoe device to the tubular bar, said shoe device including bottom end flat bars adapted to engage the supporting surface for said vehicle and slanting bars adapted to engage a portion of the periphery of a support wheel of said vehicle, adjacent said supporting surface, and means in common for moving the bars of said shoe device into engagement with the vehicle wheel and with the supporting surface, and for effecting pivotal movement of said shoe device to raise and lower said shoe device relative to said supporting surface, the means for rigidly and adjustably connecting the shoe device to the tubular bar including a sleeve slidably mounted on one end of the tubular bar and a bar radiating from the bottom end of the sleeve fastened to the shoe device, and means for holding the shoe device in inoperative position remote from the vehicle wheel and wheel supporting surface including a tubular member telescoped in the first-named tubular member and a finger on the sleeve, said second-named tubular member disposed in the path of movement of said finger when said sleeve is moved along the tubular bar.

2. The structure as defined in claim 1 characterized by spring means for pulling the shoe device into engagement with a vehicle wheel and for pulling the finger into the second-named tubular means for holding the shoe device in inoperative position.

3. The structure as defined in claim 1 wherein the means in common for moving the bars and raising and lowering the shoe device comprises an elongated handle radiating from the bar on the bottom end of the sleeve.

References Cited by the Examiner

UNITED STATES PATENTS

| 1,261,557 | 4/1918 | Kreuser | 188—4 |
| 2,585,370 | 2/1952 | Cless | 188—32 |
| 2,693,252 | 11/1954 | Bert | 188—4 |

FOREIGN PATENTS

| 1,134,246 | 11/1956 | France. |
| 27,324 | 1902 | Great Britain. |

MILTON BUCHLER, *Primary Examiner.*

B. S. MOWRY, *Assistant Examiner.*